UNITED STATES PATENT OFFICE.

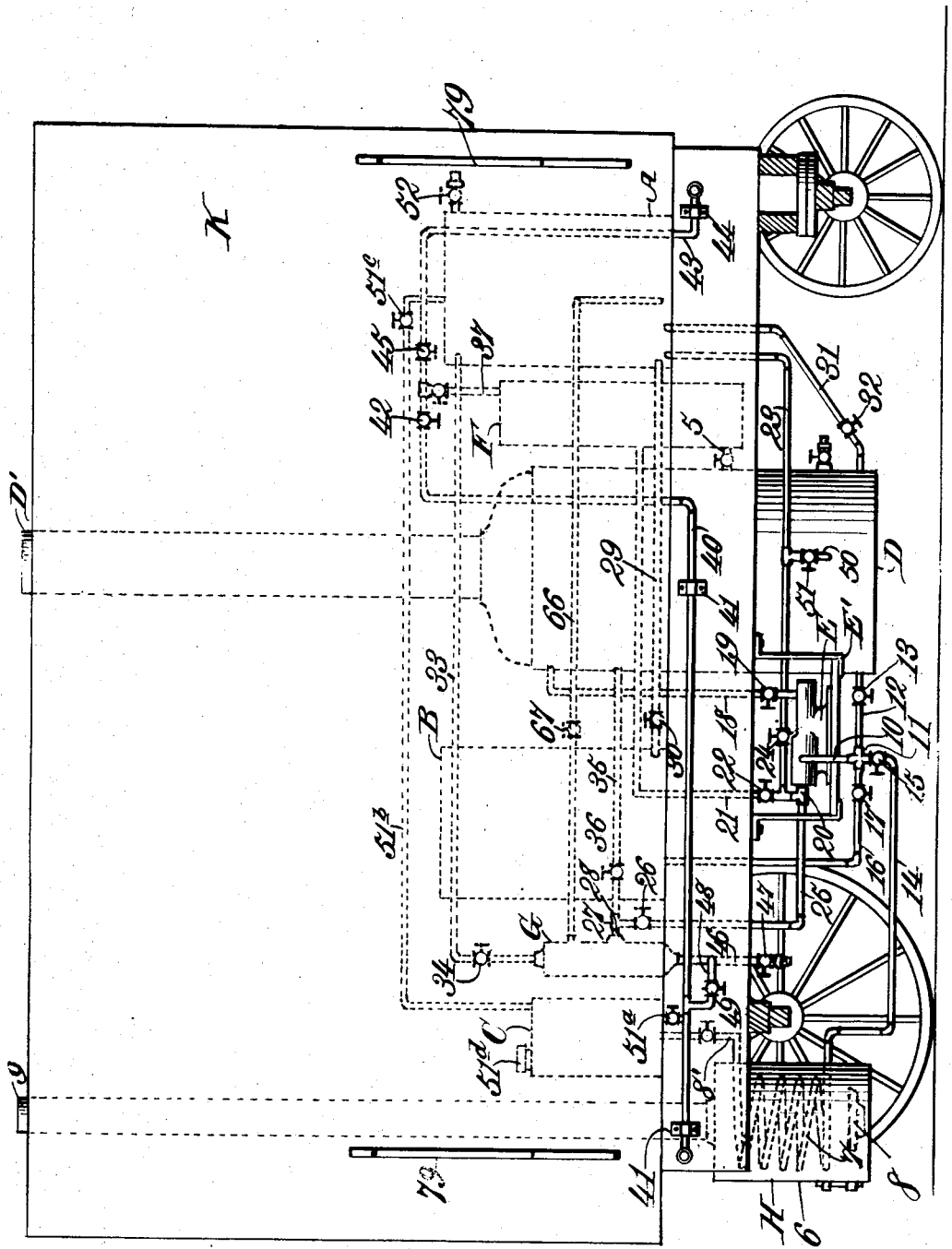

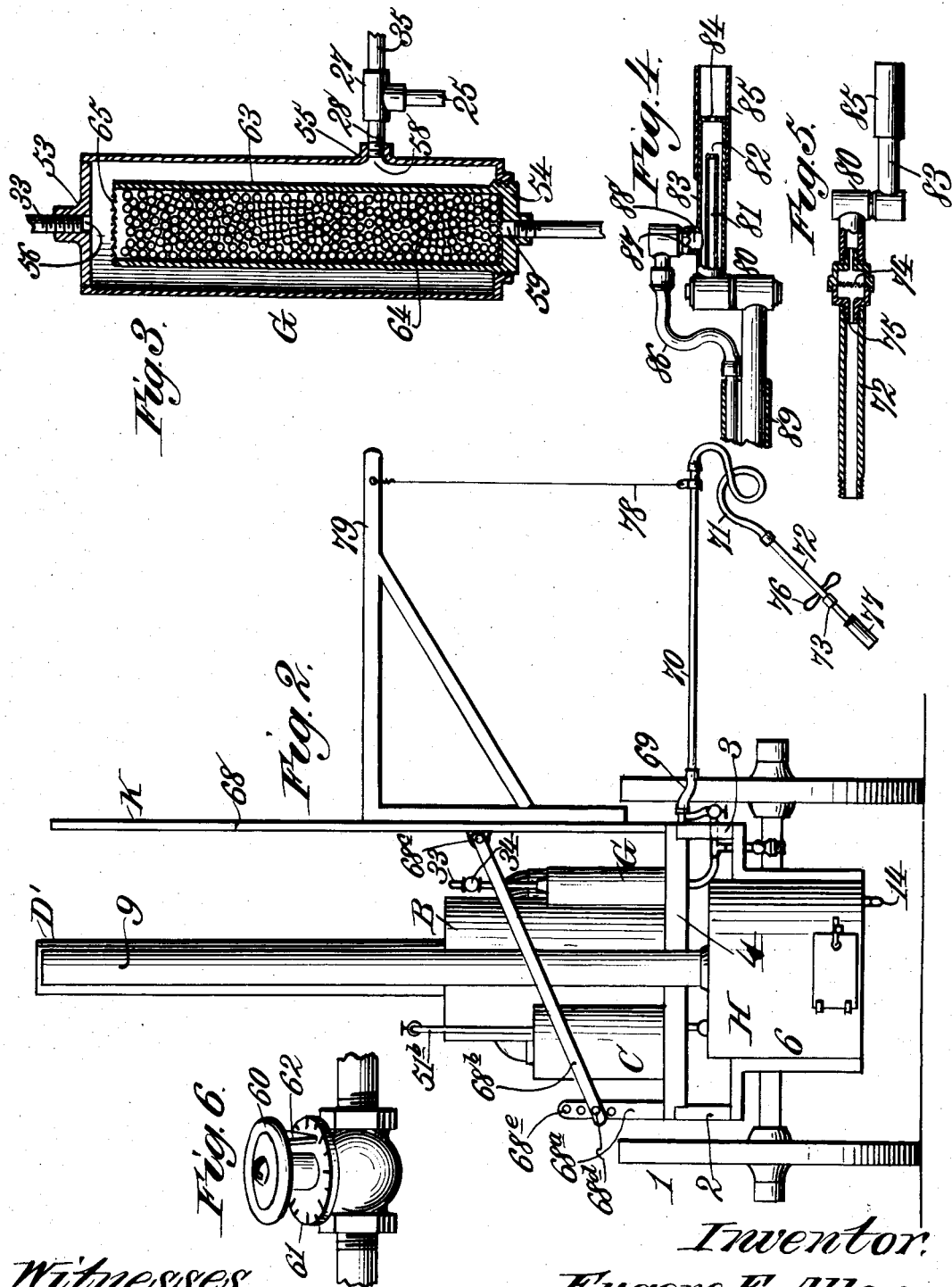

EUGENE E. ALLEN, OF SAN DIEGO, CALIFORNIA.

SPRAYING-MACHINE.

No. 834,701.  Specification of Letters Patent.  Patented Oct. 30, 1906.

Application filed May 31, 1905. Serial No. 263,191.

*To all whom it may concern:*

Be it known that I, EUGENE E. ALLEN, a citizen of the United States, residing at San Diego, in the county of San Diego and State of California, have invented a new and useful machine for spraying trees and otherwise destroying noxious insects and fungi upon, under, and around trees and plants, of which the following is a specification.

This invention relates to spraying-machines; and the object thereof is to provide means in a manner, as hereinafter set forth, whereby it is practical to spray at any suitable temperature either hot or cold water or a chemical solution and also to employ a flame for destroying noxious insects which may have dropped under or around the tree or plant or which harbor there.

The invention further aims to provide a portable heating apparatus for water or other solution, preferably a steam-boiler of sufficient capacity and strength to heat the quantity of fluid desired and to withstand a pressure which will give the force desired for spraying with or without the employment of a pump.

As it is impracticable to introduce the various oils and other chemicals used for spraying into a steam-boiler, a further object of the invention is to provide means for mixing oils and other chemicals with the hot water from the boiler in any proportion desired after the water leaves the boiler and without lessening the desired pressure.

The invention further aims to provide means in a manner as hereinafter set forth to conserve all the heat produced, so that the spray will be hot enough to destroy the scale or insect.

A further object of the invention is to provide means in a manner as hereinafter set forth so as to prevent any interference with the continuous operation of the machine.

A further object of the invention is to provide means in a manner as hereinafter set forth to throw a flame upon the ground under and around the tree, said flame being of sufficient intensity to destroy the codling-moth, the curculio, or the scale at the stage when it drops from the tree at the slightest disturbance.

The invention further aims to provide a spraying-machine which shall be comparatively simple in its construction, strong, durable, efficient in its use, and readily set up and operated.

With the foregoing and other objects in view the invention consists of the novel construction, combination, and arrangement of parts hereinafter more specifically described, and illustrated in the accompanying drawings, wherein is shown the preferred embodiment of the invention; but it is to be understood that changes, variations, and modifications can be resorted to which come within the scope of the claims hereunto appended.

In the drawings, wherein like reference characters denote corresponding parts throughout the several views, Figure 1 is a side elevation of a portable spraying-machine in accordance with this invention. Fig. 2 is a rear view thereof. Fig. 3 is a detail of the mixing device. Fig. 4 is a longitudinal sectional view of the nozzle, showing the connection between it and the duplex spray-tube. Fig. 5 is a view of the nozzle connected to a single spray-tube, and Fig. 6 is a detail showing one of the cut-offs.

A spraying-machine in accordance with this invention comprises a plurality of tanks for oil, water, or chemicals. As shown, three tanks are employed, which are indicated by the reference characters A, B, and C, and, by way of example, the tank A is adapted to contain oil, the tank B water, and the tank C a chemical solution. The machine further comprises a boiler D, a steam-pump E, a pressure-drum F, a mixer G, and a heater H. The tank C and heater H may be dispensed with, if desired. The tanks A, B, and C may be of any suitable construction and strong enough to withstand the desired pressure. The boiler D is of any desired type, preferably an upright one, and is provided with a stack D', and the construction of the pressure-drum F, mixer G, and heater H will be hereinafter referred to.

The machine further comprises a pipe system, to which are attached the spray-nozzles, and the said pipe system suitably connects together the elements A, B, C, D, E, F, G, and H.

The elements A, B, C, D, E, F, G, and H are suitably supported upon a traveling vehicle, (indicated by the reference character 1,) which is provided with a pair of side members 2 3 and a sectional bottom 4. The sections of the bottom 4 are suitably spaced apart, so that the boiler D, pressure-drum F, and heater H can be suitably suspended and supported from said bottom 4. Forwardly of the boiler D and upon the bottom 4 is arranged the tank A, and upon the bottom 4, rearwardly of the boiler D, are arranged the tanks B C; but any suitable arrangement of tanks may be employed. The pressure-drum F is connected with the boiler D through the medium of a valved pipe 5 and is of such capacity as to contain about one gallon of fluid and of sufficient strength to withstand a pressure of preferably two hundred and fifty pounds.

The heater H comprises a receptacle 6, in which are arranged a pipe-coil 7 and an oil-burner 8, and communication is had between the tank C and the coil 7 through the medium of the valved pipe connection 8', so that the solution can be withdrawn from the tank C into the coil 7 and heated to the preferred temperature. A stack 9 is provided for the receptacle 6.

The pipe system or pipe connections between the elements A, B, C, D, E, F, G, and H will now be referred to. The steam-pump E, which is supported by the bracket E', has communicating therewith an intake-pipe 10, which has connected thereto one branch of a four-way coupling 11. To another of the branches of the coupling 11 is secured the branch pipe 12, which leads from the boiler D to the pipe 10 and is provided with a cut-off 13. To another of the branches of the coupling 11 is secured a pipe 14, which leads from the coil 7 to the pipe 10 and is provided with a cut-off 15, and to the other of the branches of the coupling 11 is secured a pipe 16, which leads from the tank B to the pipe 10 and is provided with a cut-off 17. The function of the pipe 12 when the cut-off 13 is opened is to supply water from the boiler D to the pump. The function of the pipe 14 when the cut-off is opened is to supply the heated fluid from the coil 7 to the steam-pump E, and the function of the pipe 16 when the cut-off 17 is opened is to supply water from the tank B to the steam-pump E. The cut-offs 13, 15, and 17 are manipulated in the proper manner, so that the necessary supply can be had when occasion so requires. For example, if the cut-offs 15 and 17 are closed and the cut-off 13 opened water will be drawn in from the boiler D. If the cut-offs 13 and 17 are closed and the cut-off 15 opened, the solution will be drawn in from the coil 7, and if the cut-offs 13 and 15 are closed and the cut-off 17 opened cold water will be drawn in from the tank B. The steam-supply pipe for the pump E is indicated by the reference character 18, said pipe at its upper end communicating with the boiler near the top and at its lower end with the pump E. The said pipe 18 is provided with a cut-off 19.

The outlet-pipe for the pump E is indicated by the reference character 20, and said pipe communicates, through the medium of the pipe connection 21, with the drum F, so that the pump can supply a spraying solution under pressure to said drum F and from the drum be conducted to the spray-nozzles in a manner as hereinafter referred to. The pipe connection 21 is provided with a cut-off 22. The pipe 20 also communicates with the tank A through the medium of the pipe connection 23, which opens at one end into the pipe connection 21 below the cut-off 22 and at its lower end opens into the tank A, and by the employment of the pipe connection 23 the pump can supply water to the tank A, so as to force the oil therefrom into the mixer G, as will be hereinafter referred to. The pipe connection 23 is provided with a cut-off 24. The pipe 20 is also adapted to communicate with the mixer G, and the means for establishing communication between the pipe 20 and the mixer G consists of a pipe connection 25, provided with a cut-off 26 at a point removed from the upper end thereof, and the said pipe connection 25 is coupled by the T-union 27 with an inlet-pipe 28, which opens into the mixer G. The pipe connection 25 enables the pump to force water or other solution into the mixer G, and from said mixer it is conducted to the nozzles in a manner as hereinafter referred to.

Communication is had between the tanks A and B through the medium of a pipe connection 29, having a cut-off 30, and the pipe connection 29 is employed for supplying water from the tank A to the tank B when the cut-off 30 is opened, and communication is also had between the tank A and the bottom of the boiler D through the medium of the pipe connection 31, having a cut-off 32, and communication is also had between the tank A and the mixer G through the medium of the oil-feed pipe 33, which is provided with a cut-off 34.

Communication is had between the mixer G and the boiler D for the purpose of supplying steam or hot water to the mixer G through the medium of a pipe connection 35, having a cut-off 36.

The solution in the tank F is conducted to the spray-tubes, to which the nozzles are attached, as follows: Communicating with the drum F is a pipe connection 37, which opens at its top into a common feed-pipe for supplying the spraying material to the nozzles. The said spray-pipe comprises a rearwardly and a forwardly extending section. Said rearwardly-extending section is indicated by the reference character 40 and has a portion extending at an angle with respect to the pipe connection 37, a portion extending downwardly to the member 3, and the remaining portion extending rearwardly in a longitudinal direction and parallel with said member 3. Said longitudinally-extending portion of the section 40 is secured to the member 3 by the keepers 41, and to the rear end of said longitudinally-extending portion of the section 40 a spray tube or tubes is or are hinged in a manner as hereinafter referred to. The section 40 of the feed-pipe is provided with a cut-off 42. The forwardly-extending section of the feed-pipe is indicated by the reference character 43 and has a portion thereof extending at an angle with respect to the pipe connection 37, another portion extending down to the member 3, and the remaining portion extending parallel with respect to said member 3 and secured thereto by the keeper 44. The end of that portion of the section 43 which is connected to the member 3 has a spray tube or tubes hinged thereto in a manner as hereinafter referred to. The forwardly-extending section of the feed-pipe is provided with a cut-off 45. Communication is had between the feed-pipe and the mixer G through the medium of a depending pipe 46, having a cut-off 47, and communicating with said pipe 46 is a branch pipe 48, which also communicates with the section 40 of the feed-pipe, and the said branch pipe 48 is provided with a cut-off 49. To the lower end of the pipe 46 a spray tube or tubes can be connected, if desired. Communication is had between the boiler D and the pipe 23 through the medium of a pipe connection 50, provided with a cut-off 51, for a purpose to be hereinafter referred to.

When it is desired to use sulfur solution, such solution is placed in the tank C, and communication is had between the tank C and the pipe-section 40 through the medium of a valved pipe 51ª, and communication is also had between the tank C and the tank A through the medium of a pipe connection 51ᵇ, provided with a graduated cut-off 51ᶜ. An inlet 51ᵈ is provided for the tank C. It is evident that when the pressure is placed on the oil-drum and the pipe 51ª is opened the contents of the tank C will be driven out by the oil from the tank A into the pipe-section 40. The amount of sulfur solution discharged can be regulated by the cut-off 51ᶜ.

It has been found from experiments that water at a temperature of 140° will destroy scale of all kinds and that it may be used without injury to the tree or fruit when rapidly applied; but if oil is used in the proportion of one gallon to fifty gallons of water a temperature of 130° will produce the same result. As this amount of oil does not injure the tree or fruit, such small amount is generally used. When employing oil, the pipe 29, leading from the tank A to the tank B, is closed and the tank A is filled with oil. The filling of the tank A with oil is had through the medium of the inlet-cock 52. As before stated, the pipe 31 leads from the boiler to the bottom of the tank A. When this pipe 31 is opened, it is obvious that the pressure on the drum and boiler will be the same. As water is heavier than oil, the water which enters the tank A will remain at the bottom and the oil at the top. If the boiler D is connected with the spray-tube by an open pipe and water in the boiler is heated, hot water will enter the spray-tube. If the top of the oil-drum is similarly connected, oil will enter the spray-tube. If both are connected, oil and water will mingle, but not in perfect mixture.

In order to mix the oil and water uniformly and in any desired proportions, the mixer G is employed. This consists, preferably, of a heavy iron cylinder having a decreased diameter at each end and at one side, which is caused by the reducers 53, 54, and 55. The cylinder is formed with an inlet 56 at the top, with which communicates the pipe 33, an inlet 58 at the side, with which communicate the pipes 25 and 35, and an outlet 59 at the bottom, with which communicates the pipe 46, said pipe 46 being adapted to communicate in a manner as heretofore stated with the nozzles. The pipe 33 supplies oil from the tank A to the mixer G, the pipe 25 supplies cold or hot water from the steam-pump E to the mixer G, and the pipe 35 supplies steam or hot water from the boiler D to the mixer G.

The pipes leading from the pump E, the tank A, and the boiler D, as before stated, are provided with the cut-offs 26, 34, and 36. These cut-offs are graduated and are as shown in Fig. 6. Each of the said cut-offs is formed with a handle 60, a graduated plate 61, fixed to the body portion of the cut-off, and a spur or tooth 62, which is carried by the handle 60 and is adapted to traverse the plate 61 when said handle 60 is rotated. The plate 61 is provided with suitable graduations, so that the opening of the cock can be adjusted to the desired position to enable the regulating of the supply of steam, oil, and water to the mixer G. Therefore it is evident that the cut-off in the pipe leading from the boiler to the mixer may be open, so as to admit a flow of fifty times the amount of oil supplied from the tank A through the pipe 33; but although the cut-offs 26, 34, and 36 can be adjusted to regulate the flow of water, oil, and steam, yet no adjustment of these cut-offs would produce the desired result without the employment of additional means. This is evident owing to the fact that the oil, being lighter than water, will remain at the top of the mixer G until the mixer is full of oil down to the point where the water enters, and then it would eject in an unsatisfactory manner—for example, in squirts and stops.

To obtain a satisfactory ejecting of the oil and water, or a satisfactory mixture, the mixer is provided with a tube 63, which has its lower end fastened outside the reducer 54 at the bottom of the mixer G. The tube 63 extends up inside the mixer G to near the top, where the oil enters. Consequently no fluid can enter the spray-tube except over the top of the tube 63. The hot water, which enters at the side of the mixer, flows around the tube 63 and passes out through the top. The oil cannot collect, for the water prevents it from gathering, and the water cannot shut it out, for the water entering the top on all sides of the tube 63 cannot crowd. In order to mix the oil and water perfectly, the tube 63 is filled with shot 64, and to prevent any obstruction entering the spray-tube the top of the tube 64 is covered with a sieve 65. The tube 63 is so set up that it can be easily removed from the mixer G when occasion requires.

To obtain the right proportion and graduate the cut-off, the hot water is first admitted to the spray-tube and is admitted with the cut-off 36 wide open. The amount discharged in a given time is measured. The cut-off is then partly closed until the discharge is lessened one-fiftieth. The oil is then admitted. The amount used the first half-day of spraying, both of oil and water, enables the operator to ascertain all necessary adjustments. Should more oil be desired, a slight closing of the cut-off 36 will cause an increased supply of oil. Should water alone be used, the oil may be shut off and the cut-off 36 opened to its greatest extent. When all the oil in the tank A has been used, the pressure is shut off. The tank A is then connected with the tank B, an additional supply of oil is had through the inlet 52, and the water is driven out of the tank A into the tank B. With the structure heretofore set forth and the spray-pipe and nozzles, to be hereinafter referred to, very good work can be done at short range.

The fluid at the point of exit in the spray will have a temperature of about 212°. One foot from the nozzle the temperature will be reduced to 160° and at a distance of about two feet 140°. The steam in the fluid spreads out in such a manner that it soon loses its killing heat. Of course the spray-pipe could be lengthened and exposed to the cold, and the steam could thus be taken out; but this would be a loss. To overcome the difficulty in regard to losing the killing heat of the hot water by the steam, the pipe 23 is employed, which communicates with the steam-pump E and the tank A. The pipe 23, as before stated, is connected with the boiler through the medium of the pipe 50. The steam-pump is so adjusted that it will keep in motion and furnish the supply desired. The pressure on the tank A and the boiler D is thus equalized, and cold water is thrown into both. A pipe 66 is employed which communicates at one end with the mixer G and extends in the tank A and is bent downward to near the bottom of the tank A to within about two inches of the bottom of said tank. The pipe 66 is provided with a cut-off 67, similar to those used on the oil and water pipes. Through the pipe 66 cold water can be led into the mixer and then passes from there into the spray-pipe, the quantity of water being of a sufficient amount to reduce the temperature and take out the steam. By the employment of the structure just set forth the temperature of the spray is about 190° at the nozzle and has a killing heat at a distance of eight feet. By such an arrangement no heat is wasted. The cold water instead of being heated in the boiler is heated in the tube 63, and the amount of spraying material is increased.

The conservation of heat is had, by way of example, through the medium of a wind-break, consisting of a shield K, formed of a sheet of cloth or other suitable material, which is attached to a frame 68, mounted upon the bottom 4. The frame 68 is adjustably connected to a vertical upright $68^a$ by a brace-bar $68^b$, pivotally connected at one end, as at $68^c$, to the frame 68 and at its other end adjustably connected by an adjustable pin $68^d$ to the upright $68^a$. The latter is provided with a series of openings $68^e$, in which the pin $68^d$ is adapted to engage.

The spray-tubes may be attached on each side of the vehicle, but, as shown, are attached to one side of the vehicle. In case of high wind the spray-tubes are used on the same side of the vehicle and the machine is driven so that the wind strikes the wind-break, which shields the operator. A single or a duplex construction of spray-tube may be employed. The single construction of spray-tube consists of a section of flexible steam-hose 69 for each end of the feed-pipe and also for the end of the pipe 47, and to each of the steam-hose sections 69 a pipe 70 is secured, of any suitable length, and to the said pipe 70 a flexible tubing 71 is secured, and to said flexible tubing 71 a metallic pipe 72 is attached, which is formed of two sections, with a sectional union 73 interposed between the sections of the pipe 72, and the said sectional union 73 carries a strainer 74 and has reduced ends 75, which extend into and are secured to the sections of the pipe 72. The strainer 73 prevents any obstacle entering the spray-tube so as to interfere with the continuous operation of the machine. To the pipe 72 of the spray-tube handles 76 are secured, and said pipe 72 has also hinged thereto a nozzle 77. The construction of the nozzle will be hereinafter referred to. The steam-hose sections 69 act as a hinge and enable the operator to easily swing the spray-tube. The spray-tubes, which are connected to the sections 40 43 of the feed-pipe, are each held in position by a flexible member 78, carried by a crane 79, hinged to the frame 68, so that the said crane 79 can be easily swung to any position desired. The flexible tubing 71 enables the operator to raise or lower the outer portion of the spray-tube, as desired, and as the operator walks forward or backward the crane 79 swings the section 70, to which the flexible member 75 is connected, along with the operator. The spray-tubes, supported in the manner as hereinbefore stated, do not crinkle or buckle and are very easily positioned in the desired manner during the act of spraying. The sections 72 of each of the spray-tubes may be lengthened, if desired, by the insertion of one or more joints of pipe. The spray-tubes are also shortened, owing to the employment of the hinged spray-nozzles 77, the hinge being indicated by the reference character 80. By the employment of the hinge 80 it is not necessary to have the spray-tube of sufficient length so that the sections 72 can be carried to the farther side of the tree and around into the tree; but the operator may spray the farther side of the tree from the same position in which he stands while spraying one side of the tree. By pressing the top of the nozzle against a small limb the nozzle can be turned back toward the machine, and it is only necessary to have the hose of sufficient length to extend as far out as the tree or plant.

A still greater conservation of heat is effected by the manner in which the spray-nozzles are constructed. The spray-nozzles generally in use divide the particles of the fluid used so fine that if a hot spray were passed through them it would become cool and harmless, so far as the heat assisting in destroying, within one foot of the point of exit of the spraying material. If the chemicals used in spraying are thoroughly mixed before they reach the nozzle, no such division of the particles is required. The nozzle is kept in constant motion by the operator. The spray is further spread by contact with the foliage and branches, and rapid work may be done by the spray in which the globules are sufficiently large to retain the heat. The nozzle 77 comprises (see Fig. 4) an inner tube 81, which is in communication with the passage through the hinge 80. At the outer end of the tube 81 a contracted opening 82 is formed, and the said tube 81 is surrounded by a tube 83, which is of greater length than the tube 81 and has its outer end provided with a contracted opening 84, but of greater diameter than the opening 82. The nozzle 77 when used in connection with the double spray-tube, to be hereinafter referred to, is provided with an opening in the tube 83, with which communicates one of the sections of the double spray-tube; but when the single spray-tube is employed the opening in the tube 83 is dispensed with, as shown in Fig. 5. The outer tube 83 of the nozzle so retards the passage of fluid and obstructs it that it is broken up into globules, which will retain the heat and spread sufficiently to allow rapid work. When the steam-pump is not in use and the stream of cold water is not introduced into the spray, even the double nozzle is not sufficient to prevent the steam from scattering and cooling the fluid too quickly. To meet this condition, a sheath 85 is employed, consisting of a very thin sleeve slipped over the tube 83. The sheath 85 frictionally engages the tube 83 in such a manner that the said sheath 85 can be adjusted forwardly and rearwardly as occasion requires. When it is shifted forward, it holds in check the injurious effect of the fluid and to a certain extent condenses the steam and will retain a heat fatal to scale or insect to a distance of two and a half or three feet. When cold water is introduced, the sheath is slipped back, so that the fluid does not contact with it.

The duplex spray-tube comprises the assembling together of two of the single spray-tubes—that is to say, two elements 69, two elements 70, two elements 71, and two elements 72—forming thereby a spray-tube having a pair of conduits for conducting two different materials to the nozzle. One of the sections 69 communicates with the steam-supply and the other of the sections 69 communicates with an oil-supply. The elements 69, 70, and 71 and one of the elements 72 are constructed in the same manner as hereinbefore referred to, the same reference characters being applied thereto. The difference in structure between the duplex spray-tube and the single spray-tube resides in the connecting of one of the sections 72, through the medium of a flexible tubing 86, to an inlet-nipple 87, which communicates with the opening 88 in the tube 83. The sections 70, 71, and 72 are enveloped in a suitable covering, as indicated by the reference character 89. It will be evident that when two fluids are introduced into the duplex spray-tube one of the fluids will enter the tube 81 of the nozzle and the other of the fluids will enter the tube 83 of the nozzle. Thus if steam and oil are employed, both in the right proportion, one will be discharged from the tube 81 and the other from the tube 83, and if the product be ignited at the nozzle a flame would be produced of a sufficient intensity to destroy all noxious insects which may have dropped or found harborage under or around the tree. Owing to the manner of connecting the duplex spray-tube to the nozzle, no interference is had with the manipulation of the hinge of the nozzle, for the reason that the flexible tubing 86 acts as a hinge.

The operation of spraying is carried out as follows: It will be assumed that the machine is in the field and the operator desires to spray. The first step is to get up steam. Then if the operator desires to use hot water alone the cut-off is opened in the pipe which leads directly from the boiler to the mixer. The tree or plant is then sprayed with the hot water. If the water is found to be too hot, as it generally is, and there is so much steam that it spreads and does not kill the insects, the pump is started and the cold water fed to the boiler, and sufficient cold water is forced in the stream to take out most of the steam and condense the spray. Now supposing it is desired to use oil. The pipe leading from the boiler to the bottom of the oil-drum is opened and by means of the graduated cut-off on the oil-pipe the amount of oil can be regulated and the proper mixture for the spraying solution is had through the medium of the mixer. If it be desired to use sulfur solution, communication is established between the oil-drum and the tank C, and as the oil is forced out of the drum into the tank C the sulfur solution in the tank is supplied to the spray-pipe. If it be desired to make a flame, the hot water is shut off, the amount of oil is regulated, the oil and steam are fed to the mixer, and by the employment of suitable means the mixture at the nozzle is ignited. Consequently a flame is obtained. If a double spray-tube is used, the steam is led into one tube and the oil in the other tube and the mixture ignited at the nozzle.

Having thus fully described my invention, what I claim as new, and desire to secure by Letters Patent, is—

1. A spraying-machine comprising a pump, a water-tank, a valve-pipe connection between the water-tank and the pump, an oil-tank, a valve-pipe connection between the oil-tank and the pump, a chemical-tank, a valve-pipe connection between the chemical-tank and the pump, a boiler, valve-pipe connections between the boiler and the pump, a valve-pipe connection between the boiler and the oil-tank, a mixing device, a valve-pipe connection between the mixing device and the pump, a valve-pipe connection between the boiler and the mixing device, a valve pipe connection between the oil-tank and the mixing device, a valve-pipe connection between the oil-tank and the chemical-tank, and a separate nozzle communicating with said mixing device.

2. A spraying-machine comprising a pump, a water-tank, a valve-pipe connection between the water-tank and the pump, an oil-tank, a valve-pipe connection between the oil-tank and the pump, a chemical-tank, a valve-pipe connection between the chemical-tank and the pump, a boiler, valve-pipe connections between the boiler and the pump, a valve-pipe connection between the boiler and the oil-tank, a mixing device, a valve-pipe connection between the mixing device and the pump, a valve-pipe connection between the boiler and the mixing device, a valve-pipe connection between the oil-tank and the mixing device, a valve-pipe connection between the oil-tank and the chemical-tank, a pressure-drum, a valve-pipe connection between the pressure-drum and the pump, and a spraying-nozzle communicating with the pressure-drum and mixing device.

3. In a spraying-machine, a mixer comprising a casing a tube arranged therein and containing shot, said tube having a filtering medium connected to one end thereof, means for supplying fluid under pressure to said mixer, a spray-tube communicating with the mixer, and a nozzle for said spray-tube.

4. In a spraying-machine, a mixer comprising a casing, a tube arranged therein and containing shot, said casing having a pair of inlets and said tube having an outlet and a filtering medium connected to one end thereof, means for supplying fluids under pressure to said mixer, a spray-tube communicating with the mixer, and a hinged nozzle for said spray-tube.

5. A spraying-machine comprising an oil-tank, a boiler, a valved pipe connecting said tank with the boiler, a mixer, a valved pipe connecting said mixer with a boiler, a valved pipe connecting said tank with the mixer, and a spraying device communicating with the mixer.

6. A spraying-machine comprising an oil-drum, a boiler, a pipe for establishing communication between the tank and the boiler, a regulatable cut-off in said pipe, a mixer, a valved pipe connecting said mixer with the boiler, a pipe for establishing communication between the mixer and the tank, a regulatable cut-off in the pipe between the tank and the mixer, and a spraying device communicating with said mixer.

7. A spraying-machine comprising an oil-tank, a boiler, a regulatable means for establishing communication between the boiler and the tank, a mixing device, a regulatable means for establishing communication between the boiler and the mixing device, a regulatable means for establishing communication between the mixing device and the tank, and a spraying device communicating with the mixing device.

8. A spraying-machine comprising an oil-tank, a steam-pump, a boiler, means for establishing communication between the boiler and the pump, means for establishing communication between the pump and the tank, a mixing device, means for establishing communication between the mixing device and the boiler, means for establishing communication between the mixing device and the tank, and a spraying device communicating with said mixing device.

9. A spraying-machine comprising a receptacle, a heater, means for establishing communication between the heater and said receptacle, a pump, means for establishing communication between the heater and the pump, a mixing device, a boiler communicating with said mixing device and pump, and means for establishing communication between the mixing device and the pump.

10. A spraying-machine comprising an oil-receptacle, a water-receptacle, a mixing device, a boiler, a pressure-drum, a steam-pump, means for establishing communication between the water-receptacle and the said pump, means for establishing communication between the top of the boiler and said pump, means for establishing communication between the bottom of the boiler and said oil-receptacle, means for establishing communication between said pump and said oil-receptacle, means for establishing communication between said water and said oil receptacle, means for establishing communication between said drum and said pump, means for establishing communication between the pump and the mixing device, means for establishing communication between said oil-receptacle and said mixing device, means for establishing communication between the boiler and the mixing device, means for establishing communication between the drum and the spraying device, and means for establishing communication between said mixing device and the spraying device.

11. A spraying-machine comprising an oil-receptacle, a water-receptacle, a mixing device, a boiler, a pressure-drum, a steam-pump, means for establishing communication between the water-receptacle and the said pump, means for establishing communication between the bottom of the boiler and said pump, means for establishing communication between the top of the boiler and said pump, means for establishing communication between the bottom of the boiler and said oil-receptacle, means for establishing communication between said pump and said oil-receptacle, means for establishing communication between said water and said oil receptacle, means for establishing communication between said drum and said pump, means for establishing communication between the pump and the mixing device, means for establishing communication between said oil-receptacle and said mixing device, means for establishing communication between the boiler and the mixing device, means for establishing communication between the drum and the spraying device, means for establishing communication between the mixing device and the spraying device, a chemical-receptacle, a heater, means for establishing communication between the heater and the chemical-receptacle, and means for establishing communication between the heater and the pump.

12. A spraying-machine comprising an oil-receptacle, a water-receptacle, a mixing device, a boiler, a pressure-drum, a steam-pump, means for establishing communication between the water-receptacle and the said pump, means for establishing communication between the bottom of the boiler and said pump, means for establishing communication between the top of the boiler and said pump, means for establishing communication between the bottom of the boiler and said oil-receptacle, means for establishing communication beween said pump and said oil-receptacle, means for establishing communication between said water and said oil receptacle, means for establishing communication between said drum and said pump, means for establishing communication between the pump and the mixing device, means for establishing communication between said oil-receptacle and said mixing device, means for establishing communication between the boiler and the mixing device, means for establishing communication between the drum and the spraying device, and means for establishing communication between the mixing device and the spraying device, a chemical-receptacle, a heater, means for establishing communication between the heater and the chemical-receptacle, means for establishing communication between the heater and the pump, a traveling receptacle for supporting the said elements, a wind-break carried by said receptacle, and cranes for suspending the spraying devices.

13. A spraying-machine, comprising a receptacle adapted to contain a fluid, a boiler, a pipe connecting said receptacle with the boiler, a regulatable cut-off in said pipe, a mixer, a pipe connection between the mixer and said receptacle, a pipe connection between the mixer and the boiler, a regulatable cut-off in said last-mentioned pipe, and a spraying device communicating with the mixer.

14. A spraying-machine comprising a boiler, an oil-supply, a mixing device communicating at one side directly with the boiler and at its top with the oil-supply, and a spray-nozzle communicating directly with said mixer.

15. A spraying-machine comprising a boiler, an oil-supply, a mixing device communicating at one side directly with the boiler and at its top with the oil-supply, a pump communicating directly with the oil-supply, boiler and mixing device, and a spray-nozzle communicating directly with said mixer.

16. A spraying-machine provided with a vertical wind-break extending in the direction of the length of the machine and arranged at one side thereof, and an adjustable means connected to the wind-break and to the opposite side of the machine-body for angularly supporting the wind-break with respect to the body of the machine.

17. A spraying-machine comprising a traveling vehicle, a wind-break carried at one side of said vehicle and extending in the direction of the length thereof, means connected with the wagon-body and to the wind-break for supporting and angularly adjusting the wind-break, means for supplying a spraying solution, a spray-tube embodying a suspended section universally connected with said supply means, a pair of cranes carried by the wind-break, vertically-extending flexible members depending from the cranes and connected to said section of the spray-tube for suspending it, and a hinged nozzle universally connected with said section of the spray-tube.

18. In a spraying-machine, a mixer comprising a casing, a tube arranged therein and containing shot, said casing having a pair of inlets and said tube an outlet, combined with means for supplying fluids under pressure to said mixer, a spray-tube communicating with the outlet of the said casing, and a nozzle for said spray-tube.

19. In a spraying-machine, a mi   comprising a casing, a tube arranged therein and containing shot, combined with means for supplying a fluid to one end of said mixer, means for supplying a fluid intermediate the ends of said mixer, a spray-tube communicating with the said mixer, and a nozzle for said spray-tube.

20. In a spraying-machine, a mixer comprising a casing, a tube arranged therein and containing shot, combined with means for supplying a fluid to one end of said mixer, means for supplying a fluid intermediate the ends of said mixer, a spray-tube communicating with the said mixer, a nozzle for said spray-tube, and a sheath adjustably mounted upon said nozzle.

21. A spraying-machine comprising a mixer, said mixer consisting of a casing provided with an inlet and an outlet, said inlet arranged intermediate the ends of said casing, and a tube arranged in the casing and containing shot.

22. A spraying-machine comprising a mixer, said mixer consisting of a casing provided with an inlet and an outlet, said inlet arranged intermediate the ends of said casing, a tube arranged in the casing and containing shot, combined with means for supplying fluids under pressure to said mixer, a spray-tube communicating with said casing, and a nozzle for said spray-tube.

23. A spraying device comprising a boiler, a mixer, a pipe connection directly extending from one side of the boiler to one side of the mixer, said pipe connection adapted to supply fluid from the boiler to the mixer, a fluid-supply pipe communicating with said mixer, regulatable valves for said fluid-supply pipe and said pipe connections, a spray-tube communicating with the mixer, and a hinged nozzle connected to the spray-tube.

24. A spraying device comprising a boiler, a mixer, a pipe connection directly extending from one side of the boiler to one side of the mixer, said pipe connection adapted to supply fluid from the boiler to the mixer, a fluid-supply pipe communicating with said mixer, regulatable valves for said fluid-supply pipe and said pipe connection, a pump, means for establishing communication between said pipe connection and said pump, a spray-tube communicating with the mixer, and a nozzle connected to the spray-tube.

25. A spraying-machine comprising a boiler, a mixer, said mixer provided with an outlet and further provided in the side with an inlet intermediate the ends thereof, and a pipe connection between said inlet and said boiler.

26. A spraying-machine comprising a boiler, a mixer, said mixer provided with an outlet and further provided in the side with an inlet intermediate the ends thereof, and a pipe connection between said inlet and said boiler, a regulatable valve in said pipe connection, and a spray-tube communicating with said outlet.

27. A spraying-machine comprising a boiler, a fluid-supply, a mixing device, means for supplying fluid from said fluid-supply to said mixing device, means for directly supplying a hot fluid from said boiler to said mixing device at the side of the latter, a spray-tube communicating with the mixing device, and a nozzle communicating with said tube.

28. A spraying-machine comprising a boiler, a fluid-supply, a mixing device, means for supplying fluid from said fluid-supply to said mixing device, means for supplying a hot fluid from said boiler to said mixing device at the side of the latter, a spray-tube communicating with the mixing device, a nozzle communicating with said tube, and a feed-pump communicating with the boiler and with the said mixing device.

EUGENE E. ALLEN.

Witnesses:
MAUDE W. BABCOCK,
C. A. BABCOCK, Jr.